Figure 1:
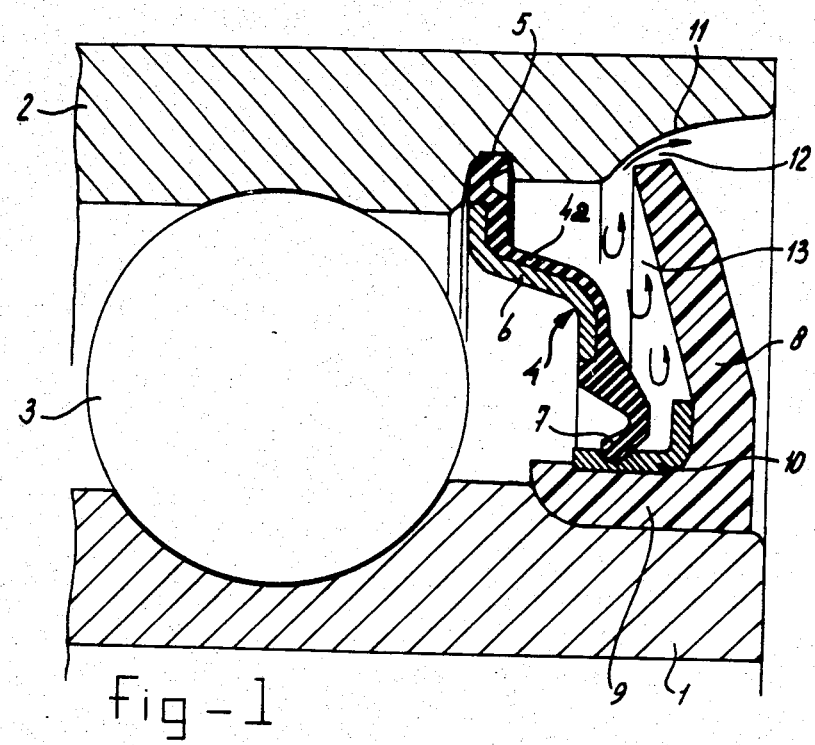

United States Patent [19]
Bras et al.

[11] Patent Number: 4,639,149
[45] Date of Patent: Jan. 27, 1987

[54] SEAL FOR A ROLLER BEARING

[75] Inventors: Johan Chr. M. Bras, Trichi; Herman D. Lankamp, Odijk, both of Netherlands

[73] Assignee: SKF Indutrial Trading & Development Company B. V., Netherlands

[21] Appl. No.: 751,288

[22] Filed: Jul. 2, 1985

[30] Foreign Application Priority Data

Jul. 13, 1984 [NL] Netherlands .......................... 8402222

[51] Int. Cl.$^4$ .......................... F16C 33/78; F16J 15/40
[52] U.S. Cl. .................... 384/477; 384/484; 277/50; 277/68
[58] Field of Search .......................... 277/50, 53, 67, 68, 277/69, DIG. 8, DIG. 4; 384/130, 135, 144, 147, 151, 477, 480, 484, 485, 486, 489, 478

[56] References Cited

U.S. PATENT DOCUMENTS

| | | | |
|---|---|---|---|
| 3,341,264 | 9/1967 | Otto | 384/486 |
| 3,741,615 | 6/1973 | Otto | 384/486 |
| 4,427,202 | 1/1984 | Backlin | 277/68 |

FOREIGN PATENT DOCUMENTS

| | | | |
|---|---|---|---|
| 514842 | 7/1955 | Canada | 384/484 |
| 1233669 | 5/1971 | United Kingdom | 384/484 |
| 2030236 | 4/1980 | United Kingdom | 384/484 |

Primary Examiner—Stuart S. Levy
Assistant Examiner—David Werner
Attorney, Agent, or Firm—Eugene E. Renz, Jr.

[57] ABSTRACT

A bearing assembly comprising inner and outer rings having spaced raceways for a plurality of rolling elements, seal means adjacent at least one axial end of the rings completely within the axial confines of the rings comprising a first sealing element and an annular shield of a rigid material secured to one of the race rings spaced axially outwardly of the first sealing element and having an outer edge spaced from an arcuate wall of the other race ring to define a slotshaped opening to form between the first sealing element and the shield a chamber connected via the slot-shaped opening to the environment of the bearing.

3 Claims, 2 Drawing Figures

SEAL FOR A ROLLER BEARING

The invention concerns a roller bearing, generally consisting of an inner race, an outer race and in between these at least one row of rolling elements with a lubricant, as well as of sealing items between and at the outside of the races, which sealing items are each formed by a generally annular element attached at the outer circumference to one of the races and include, at the inner circumference, a sealing lip of a flexible material, which is adjacent to the other race. A similar roller bearing is generally known.

When a similar roller bearing, in particular a wheel bearing, is placed under load in an environment which may be described as aggressive, for example, a moist, watery or muddy environment, moisture, water or dirt will penetrate between the sealing lip and the adjacent plane into the bearing, leading to premature bearing defects. This problem could be solved by executing the sealing lip in such manner that it presses more forcefully against the aforementioned adjacent plane. However, this will increase the friction, leading to higher temperatures in the bearing and considerable wear and tear of the sealing lip, which will cause the lubricant to flow from the bearing, leading once more to a shorter working life than the bearing warranty claims.

The purpose of the invention is to create a roller bearing of the type mentioned with an improved seal which does not require, however, that the sealing lip be pressed more forcefully against the adjacent plane. This purpose is met by providing the roller bearing according to the invention, beside the side facing outward of the sealing items, and at some distance from these, with an annular element or shield of a basically rigid material, such as a metal or a synthetic product, whereby this annular element is attached at the inner circumference of the other race and between the outer circumference thereof and the one race, there is a generally slot-shaped opening, whereby between the sealing items and the annular element or shield, a space is formed which is connected, via the slot-shaped opening, to the environment of the bearing. It has been shown that during the operation of a bearing according to the invention, the resulting centrifugal forces generate, in the moisture or water which penetrate via the slot-shaped opening in the space between the sealing items and the shield, a current which prevents moisture, water or dirt from penetrating between the sealing lip and its adjacent plane into the bearing, so that this current also functions as a seal.

The shield will preferably include a—with regard to the bearing—inwardly or axially projecting ring surrounding the other race, whereby the sealing lip of the sealing items is basically adjacent to the outer circumference of this ring. In an advantageous execution, the outer circumference of the ring is equipped with an element for attachment, against which the sealing lip of the sealing items rests.

It should be noted that, for example from the British Pat. No. 1,598,681, a bearing is known in which the sealing items are equipped with, and attached to, a ring which has also been placed on the outside of the bearing. However, in this known execution the insight is lacking to create a specific space between the separate elements, i.e., the sealing items and the annular shield.

Figure 2:
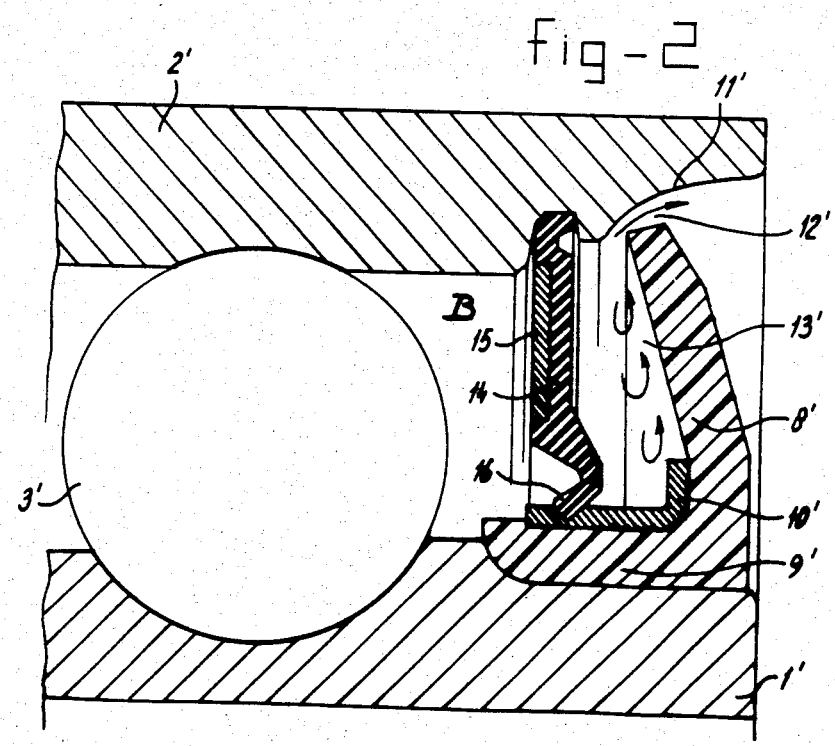

The invention is further described with reference to the drawing in which:

FIG. 1 shows in axial section part of a roller bearing according to the invention; and FIG. 2 shows part of another form of execution of a bearing according to the invention, in axial section.

As represented in FIG. 1, the bearing includes an inner race 1 and an outer race 2, and in between these a row of roller elements 3 in a lubricant (not further indicated). An annular sealing element 4 is contained at the outer circumference in a groove 5 formed in the outer race 2. This sealing ring consists of a flexible material 4a with, along part of it, an element 6 for support and rigidity, and a sealing lip 7 along the inner circumference of the sealing ring 4. Around the inner race 1 there is a second annular element or an annular shield 8 manufactured of a basically rigid material, for example, out of a stainless steel plate or aluminum or a synthetic product. Part of the shield 8 forms a ring 9 projecting inwardly in an axial direction, while an element for attachment 10 is applied around this ring 9. The outer circumference of the shield 8 is located at some distance from a bow-shaped recess 11 in the outer race 2, so that a slot-shaped opening 12 is formed.

When the bearing shown in FIG. 1 is used in a moist, watery or muddy environment, the moisture or water can penetrate through the slot-shaped opening 12 into the space 13 formed between the sealing ring 4 and the shield 8. When the roller bearing is placed under load whereby, for example, the inner race 1 rotates, a current is generated in the moisture or water in space 13 under the influence of, among others, centrifugal forces, as indicated by the arrows in FIG. 1, which current prevents moisture or water from penetrating between the sealing lip 7 and the adjacent plane formed by the ring 10 into the bearing, because it has been shown that, under the circumstances, the current is directed away from the sealing lip 7.

The roller bearing shown in FIG. 2 corresponds largely to the bearing shown in FIG. 1, so that corresponding parts are indicated by the same reference numbers, but with the addition of a prime symbol. However, in the bearing shown in FIG. 2, the sealing ring 14 and the support element 15 are almost straight, so that a somewhat different space 13' is formed between this ring-shaped sealing item 14 and the shield 8'. The sealing lip 16 of the sealing ring 14 is also adjacent to the element for attachment 10'. The extra sealing action which follows from the construction measure according to the invention is again the same as in the bearing model shown in FIG. 1. The advantage in this respect, however, is that the space B for the lubricant with regard to the space 13' for the current, can be adapted to specific circumstances according to the application of the bearing, for example, through the application of a larger amount of lubricant.

What is claimed is:

1. A bearing assembly comprising inner and outer rings having spaced raceways for a plurality of rolling elements, seal means adjacent at least one axial end of the rings completely within the axial confines of the rings comprising a first sealing element including a sealing lip sealing the annular space between the rings and an annular shield of a rigid material secured to one of the race rings spaced axially outwardly of said first sealing element and having an outer edge spaced from an arcuate wall of the other race ring to define a slot-shaped opening adjacent the ring opposite the ring engaged by the sealing lip to form between the first sealing element and said shield a chamber connected via the slot-shaped opening to the environment of the bearing whereby upon relative rotation of the rings a current is created in said chamber directed away from the sealing lip to prevent penetration of the sealing lip by moisture and foreign matter in said chamber.

2. A bearing assembly according to claim 1, characterized by the fact that the shield (8, 8') includes a, with regard to the rolling elements of the bearing assembly, an inwardly or axially projecting ring (9, 9') which surrounds said one of said race rings (1,1'), whereby the sealing lip (7, 16) of the first sealing element (4, 14) is basically adjacent to the outer circumference of said axially projecting ring (9, 9).

3. A bearing assembly according to claim 2, characterized by the fact that, around the outer circumference of the axially projecting ring (9, 9'), an element for attachment (10, 10') has been installed, which is adjacent to the sealing lip (7, 16) of the first sealing element (4, 14).

* * * * *